(12) United States Patent
Colas et al.

(10) Patent No.: US 12,503,395 B2
(45) Date of Patent: Dec. 23, 2025

(54) FLUIDIZING COMPOUNDS FOR HYDRAULIC COMPOSITIONS

(71) Applicants: CHRYSO, Issy les Moulineaux (FR); SAINT-GOBAIN PLACO, Courbevoie (FR)

(72) Inventors: Antoine Colas, Bourg-la-Reine (FR); Vincent Etienne Claude Froidevaux, Pairs (FR); Frédéric Leising, Avilly Saint Leonard (FR)

(73) Assignees: CHRYSO, Issy-les-Moulineaux (FR); SAINT-GOBAIN PLACO, Courbevoie (FR)

( * ) Notice: Subject to any disclaimer, the term of this patent is extended or adjusted under 35 U.S.C. 154(b) by 706 days.

(21) Appl. No.: 17/786,407

(22) PCT Filed: Dec. 17, 2020

(86) PCT No.: PCT/EP2020/086679
§ 371 (c)(1),
(2) Date: Jun. 16, 2022

(87) PCT Pub. No.: WO2021/122924
PCT Pub. Date: Jun. 24, 2021

(65) Prior Publication Data
US 2023/0095714 A1    Mar. 30, 2023

(30) Foreign Application Priority Data
Dec. 17, 2019 (FR) ..................... 19 14622

(51) Int. Cl.
*C04B 24/32* (2006.01)
*C04B 28/02* (2006.01)
C04B 103/30 (2006.01)
C04B 103/32 (2006.01)

(52) U.S. Cl.
CPC .............. *C04B 24/32* (2013.01); *C04B 28/02* (2013.01); *C04B 2103/32* (2013.01); *C04B 2103/34* (2013.01)

(58) Field of Classification Search
CPC ..... C04B 24/32; C04B 28/02; C04B 2103/32; C04B 2103/34; C04B 2103/30; C04B 24/023; C04B 24/045; C04B 24/124; C04B 40/0039; C08G 2650/50; C08G 65/3315; C08G 65/3326
See application file for complete search history.

(56) References Cited

U.S. PATENT DOCUMENTS 5,098,986 A * 3/1992 Speranza ................ C08L 63/00
528/149

| | | | |
|---|---|---|---|
| 2004/0176502 A1* | 9/2004 | Raymond | C04B 41/009 523/416 |
| 2011/0160349 A1 | 6/2011 | Frunz et al. | |
| 2013/0019779 A1 | 1/2013 | Georges et al. | |
| 2013/0149264 A1* | 6/2013 | Nguyeni | A61Q 17/04 424/59 |
| 2014/0303289 A1 | 10/2014 | Muller et al. | |
| 2015/0114266 A1 | 4/2015 | Vierle et al. | |
| 2017/0174839 A1 | 6/2017 | Clough et al. | |
| 2018/0248131 A1 | 8/2018 | Inagaki et al. | |
| 2019/0016635 A1 | 1/2019 | Rinaldi et al. | |

FOREIGN PATENT DOCUMENTS

| | | | |
|---|---|---|---|
| CA | 2786829 A1 * | 9/2011 | ............. C04B 14/06 |
| CN | 102131745 A | 7/2011 | |
| CN | 102482150 A | 5/2012 | |
| CN | 102712532 A | 10/2012 | |
| CN | 104302596 A | 1/2015 | |
| CN | 105467766 A | 4/2016 | |
| CN | 106133001 A | 11/2016 | |
| CN | 107207458 A | 9/2017 | |
| EP | 1 686 101 | 8/2006 | |
| EP | 2607332 A1 | 6/2013 | |
| FR | 2 696 736 | 4/1994 | |
| FR | 2 925 484 | 6/2009 | |

(Continued)

OTHER PUBLICATIONS

Liao et al. Scalable and versatile graphene functionalized with the Mannich condensate, Applied Materials & Interfaces, 5, 2174-2181 (Year: 2013).*
International Search Report dated Feb. 22, 2021, for PCT/EP2020/086679, 5 pp., including English translation.
Written Opinion dated Feb. 22, 2021, for PCT/EP2020/086679, 5 pp.
French Search Report dated Aug. 3, 2020, for FR1914622, 2 pp.
Du et al., "Organic Chemical", Wuhan University Press, Dec. 2015, pp. 1-7.

(Continued)

*Primary Examiner* — Anthony J Green
*Assistant Examiner* — Anastasia A. Kuvayskaya
(74) *Attorney, Agent, or Firm* — NIXON & VANDERHYE

(57) ABSTRACT

Disclosed is a compound with the following formula (I):

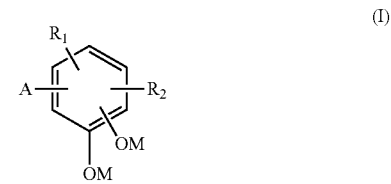

as well as the use thereof, in particular as a chelating agent of positively charged ions, or as a fluidizing agent for hydraulic compositions. Also disclosed is a hydraulic composition comprising a compound with formula (I), at least one hydraulic binder, at least one aggregate, and water.

20 Claims, No Drawings

(56) References Cited

FOREIGN PATENT DOCUMENTS

| JP | H08207420 A | 8/1996 |
|----|-------------|--------|
| WO | 02/22520 | 3/2002 |
| WO | 2006079902 A1 | 8/2006 |
| WO | 2009/112647 | 9/2009 |

* cited by examiner

FLUIDIZING COMPOUNDS FOR HYDRAULIC COMPOSITIONS

This application is the U.S. national phase of International Application No. PCT/EP2020/086679 filed Dec. 17, 2020, which designated the U.S. and claims priority to FR 1914622 filed Dec. 17, 2019, the entire contents of each of which are hereby incorporated by reference.

BACKGROUND OF THE INVENTION

Field of the Invention

The subject matter of the present invention relates to novel fluidizing compounds, intended in particular for hydraulic compositions.

Description of the Related Art

Hydraulic compositions are compositions comprising a hydraulic binder. A hydraulic binder is a binder that forms and hardens by chemical reaction with water. The compositions of calcium sulfates and/or aluminates, lime and cement may be cited as hydraulic binders. Mortars and concrete, in particular prefabricated and ready-to-use concrete, have special importance. Such materials can be used in particular in building, civil engineering structures or in the manufacture of concrete parts.

It is known to add fluidifiers (also called plasticizers or superplasticizers) to the hydraulic binders, which allow the hydraulic composition to be fluidized, thus reducing the water content of the hydraulic binder paste. Thus, after hardening, the hydraulic binder paste has a denser structure. This results in higher mechanical strength.

Polyoxyalkylene polycarboxylates (PCPs) are known to be particularly effective in fluidizing hydraulic compositions and same are also called superplasticizers.

Other polymer superplasticizers for the fluidification of concrete mortars have been developed, such as the bisphosphonate poly(ethylene oxide) single-chains described in application FR 2 696 736, and marketed by the Company CHRYSO under the name of CHRYSO® Fluid Optima 100. The patent application FR 2 925 484 by LAFARGE SA also describes a type of polymer superplasticizer for the fluidification of concrete mortars, consisting of ester derivatives of gallic acid.

However, such superplasticizers have limited water-reducing and robustness properties with regard to clays and alkali sulfates in solution. In addition, it should be noted that the chemical stability in a highly alkaline concrete medium is very limited in the case of the structures described in the patent application FR 2 925 484.

Hence the present need to have more efficient fluidizing compounds available.

SUMMARY OF THE INVENTION

The purpose of the present invention is to provide new compounds which are particularly effective as fluidifiers in hydraulic compositions.

Thus, the present invention relates to a compound with the following formula (I):

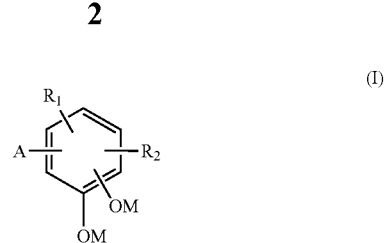

wherein:
M is chosen from the group consisting of H, alkaline and alkaline earth metals and $^+HNRR'$, R and R' groups which are being chosen independently from each other from H, ($C_1$-$C_3$) alkyls, either linear or branched, and alcohols in $C_1$-$C_3$, either linear or branched;
$R_1$ is chosen from the group consisting of H, $A_1$ and ($C_1$-$C_4$) alkyl groups, either linear or branched, when A matches formula (1) hereafter, or, where A is described by the formula (2) or (3) below, $R_1$ is chosen from the group consisting of H and ($C_1$-$C_4$) alkyl groups, either linear or branched;
$R_2$ is chosen from the group consisting of H, OM, where M is as defined above, and ($C_1$-$C_4$) alkyl groups, either linear or branched;
A stands for:
a group $A_1$ with the following formula (1):

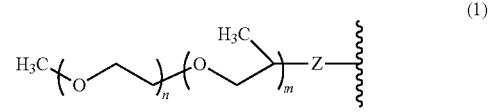

wherein:
n is an integer from 1 to 40, preferentially from 1 to 31;
m is an integer from 1 to 40, preferentially from 1 to 31; and
Z is chosen from the group consisting of:
—$CHR_3$—NH— groups, $R_3$ being chosen from the group consisting of H, COOH and ($C_1$-$C_6$) alkyl groups, either linear or branched;
—C(=O)—NH— groups; and
—C($R_5$)=N— groups, where $R_5$ is H or Me, preferentially H;
a group $A_2$ with the following formula (2):

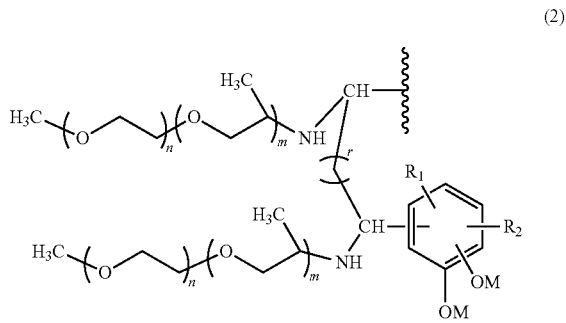

wherein:
n is an integer from 1 to 40, preferentially from 1 to 31;

m is an integer from 1 to 40, preferentially from 1 to 31;

r is 0 or an integer from 1 to 6; and

M, $R_1$ and $R_2$ are as defined above in formula (I);

a group $A_3$ with the following formula (3):

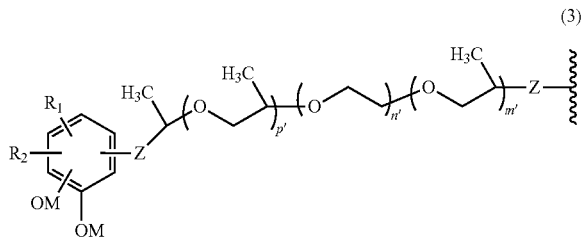

wherein:
n' is an integer from 1 to 50, preferentially from 1 to 39;

the sum of m'+p' varies from 1 to 6;

m' is an integer from 1 to 5;

p' is an integer from 1 to 5; and

M, $R_1$ and $R_2$ are as defined above in formula (I);

Z is as defined above in formula (1).

Within the framework of the present invention:

$C_t$-$C_z$ where t and z can take values from 1 to 6, refers to a carbon chain that can have from t to z carbon atoms, e.g. $C_1$-$C_4$ a carbon chain that can have from 1 to 4 carbon atoms;

an alkyl group refers to: an either linear or branched, saturated hydrocarbon aliphatic group comprising, unless otherwise specified, 1 to 6 carbon atoms. Examples include methyl, ethyl, n-propyl, isopropyl, butyl, isobutyl, tertbutyl or pentyl.

For an alkaline metal, we can cite e. g. sodium, lithium or potassium. For an alkaline earth metal, we can cite magnesium and calcium.

Within the framework of the present invention, a $C_1$-$C_3$ alcohol, either linear or branched, means a $C_1$-$C_3$ alkyl, either linear or branched, substituted by at least one hydroxyl group.

Preferentially, in formulae (1) and (2) above, n is an integer from 1 to 31 and m is an integer from 1 to 31.

According to one embodiment, the compounds of the invention are compounds with the aforementioned formula (I) wherein A stand for a group $A_1$ with formula (1) and $R_1$ is chosen from the group consisting of H, $A_1$ and ($C_1$-$C_4$) alkyl groups, either linear or branched.

According to one embodiment, the compounds of the invention have the following formula (II):

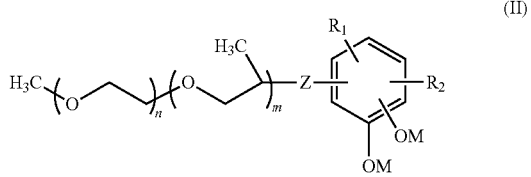

wherein:
$R_1$ is chosen from the group consisting of H and ($C_1$-$C_4$) alkyl groups, or stands for a group $A_1$ with formula (1) as defined above; and M and $R_2$ are as defined above in formula (I) and n and m are as defined above in formula (1).

Preferentially, in formula (II), n is an integer from 1 to 31 and m is an integer from 1 to 31.

According to one embodiment, in formula (II), $R_2$ is an OM group, M being as defined above.

According to one embodiment, in formula (II), n varies from 19 to 31.

According to one embodiment, in formula (II), m varies from 3 to 10.

According to one embodiment, in formula (II), Z is chosen from the group consisting of:
—$CHR_3$—NH— groups, where $R_3$ is chosen from the group consisting of H, COOH and ($C_1$-$C_6$) alkyl groups, either linear or branched; and
—C(=O)—NH— groups.

According to one embodiment, in formula (II), Z is chosen from the group consisting of —$CHR_3$—NH—, $R_3$ is chosen from the group consisting of H, COOH and ($C_1$-$C_6$) alkyl groups, either linear or branched.

According to one embodiment, in formula (II), Z is a —$CHR_3$—NH-group where $R_3$ is H or COOH, or a —C(=O)—NH— group.

According to one embodiment, in formula (II), Z is a —$CHR_3$—NH-group where $R_3$ is H or COOH.

According to one embodiment, the compounds of the invention have the formula (II), wherein:
$R_2$ is an OM group, M being as defined above;
n varies from 19 to 31;
m varies from 3 to 10; and
Z is chosen from the group consisting of:
—$CHR_3$—NH— groups, where $R_3$ is chosen from the group consisting of H, COOH and ($C_1$-$C_6$) alkyl groups, either linear or branched; and
—C(=O)—NH— groups.

According to one embodiment, the compounds of the invention have the formula (II), wherein:
$R_2$ is an OM group, M being as defined above;
n varies from 19 to 31;
m varies from 3 to 10; and
Z is chosen from the group consisting of —$CHR_3$—NH— groups, $R_3$ being chosen from the group consisting of H, COOH and ($C_1$-$C_6$) alkyl groups, either linear or branched.

Preferentially, the compounds of the invention have the formula (II) as defined above, wherein $R_1$ is H or stands for a group $A_1$ with formula (1) as defined above.

A preferred family of compounds of the invention consists of compounds with the above-mentioned formula (II), wherein:
$R_1$ is H or stands for a group $A_1$ with formula (1) as defined above;
$R_2$ is an OM group;
n varies from 19 to 31;
m varies from 3 to 10; and
Z is chosen from the group consisting of:
—$CHR_3$—NH— groups, where $R_3$ is chosen from the group consisting of H, COOH and ($C_1$-$C_6$) alkyl groups, either linear or branched; and
—C(=O)—NH— groups.

A preferred family of compounds of the invention consists of compounds with the above-mentioned formula (II), wherein:
$R_1$ is H or stands for a group $A_1$ with formula (1) as defined above;
$R_2$ is an OM group;
n varies from 19 to 31;

m varies from 3 to 10; and

Z is chosen from the group consisting of —$CHR_3$—NH— groups, $R_3$ being chosen from the group consisting of H, COOH and ($C_1$-$C_6$) alkyl groups, either linear or branched.

According to one embodiment, in formula (II), n is equal to 19.

According to one embodiment, in formula (II), n is equal to 31.

According to one embodiment, in formula (II), m is equal to 3.

According to one embodiment, in formula (II), m is equal to 10.

A specific group of compounds according to the invention is composed of compounds with formula (II) as defined above, wherein n=19 and m=3.

Another specific group of compounds according to the invention is composed of compounds with formula (II) as defined above, wherein n=31 and m=10.

A preferred family of compounds of the invention consists of compounds with the above-mentioned formula (II), wherein:
  $R_1$ is H or stands for a group $A_1$ with formula (1) as defined above;
  $R_2$ is an OM group;
  n varies from 19 to 31;
  m varies from 3 to 10; and
  Z is chosen from the group consisting of:
    —$CHR_3$—NH— groups, where $R_3$ is chosen from the group consisting of H, COOH and ($C_1$-$C_6$) alkyl groups, either linear or branched; and
    —C(=O)—NH— groups.

A preferred family of compounds of the invention consists of compounds with the above-mentioned formula (II), wherein:
  $R_1$ is H or stands for a group $A_1$ with formula (1) as defined above;
  $R_2$ is an OM group;
  n varies from 19 to 31;
  m varies from 3 to 10; and
  Z is chosen from the group consisting of —$CHR_3$—NH— groups, $R_3$ being chosen from the group consisting of H, COOH and ($C_1$-$C_6$) alkyl groups, either linear or branched.

A preferred family of compounds of the invention consists of compounds with the above-mentioned formula (II), wherein:
  $R_1$ is H or stands for a group $A_1$ with formula (1) as defined above;
  $R_2$ is an OM group;
  n varies from 19 to 31;
  m varies from 3 to 10; and
  Z is chosen from the group consisting of:
    —$CHR_3$—NH— groups, $R_3$ being chosen from the group consisting of H and COOH; and
    —C(=O)—NH— groups.

Preferentially, in this family, n=19 and m=3 or n=31 and m=10.

A preferred family of compounds of the invention consists of compounds with the above-mentioned formula (II), wherein:
  $R_1$ is H or stands for a group $A_1$ with formula (1) as defined above;
  $R_2$ is an OM group;
  n varies from 19 to 31;
  m varies from 3 to 10; and
  Z is chosen from the group consisting of —$CHR_3$—NH—, $R_3$ is chosen from the group consisting of H and COOH.

Preferentially, in this family, n=19 and m=3 or n=31 and m=10.

Among the compounds with formula (II) according to the present invention, we can mention, in particular, the compounds described by one with the following formulae:

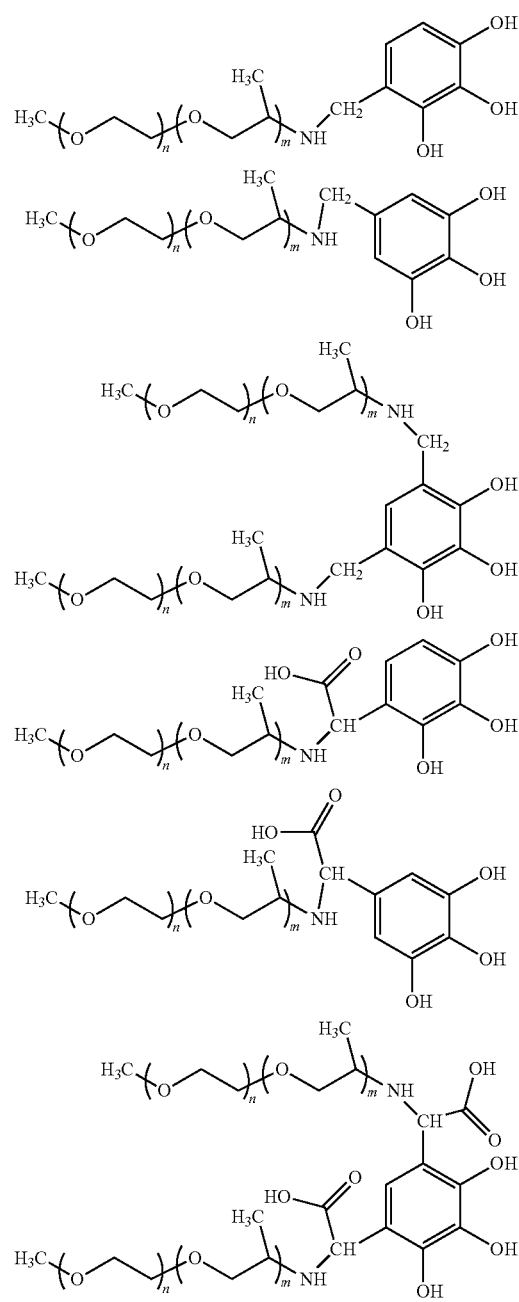

m and n being as defined above, preferentially n=19 and m=3 or n=31 and m=10.

Among the compounds with formula (II) according to the present invention, we can mention, in particular, the compounds described by one with the following formulae:

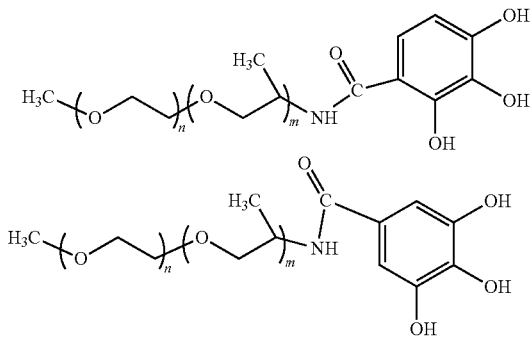

m and n being as defined above, preferentially n=19 and m=3 or n=31 and m=10.

According to one embodiment, the compounds of the invention are compounds with the above-mentioned formula (I) wherein A stands for a group $A_2$ with formula (2) and $R_1$ is chosen from the group consisting of H and ($C_1$-$C_4$) alkyl groups, either linear or branched.

According to one embodiment, the compounds of the invention have the following formula (III):

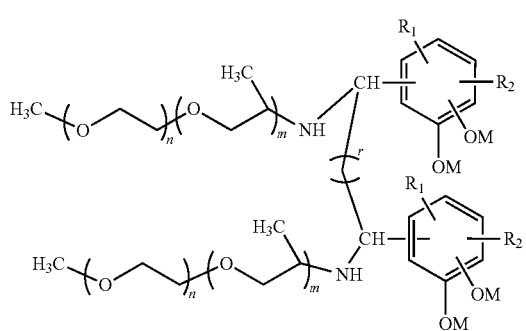

wherein:
$R_1$ is chosen from the group consisting of H and ($C_1$-$C_4$) alkyl groups; and
M and $R_2$ are as defined above for formula (I), and
n, m and r are as defined above for formula (2).

Preferentially, in formula (III), n is an integer from 1 to 31 and m is an integer from 1 to 31.

According to one embodiment, in formula (III), $R_2$ is an OM group, M being as defined above.

Preferentially, in formula (III), r is 0 or varies from 1 to 3.

According to one embodiment, in formula (III), $R_2$ is an OM group, M being as defined above, and r is 0 or varies from 1 to 3.

According to one embodiment, in formula (III), $R_1$ is H.

A preferred group of compounds according to the invention is composed of compounds with formula (III) as defined above, wherein $R_1$ is H and $R_2$ is an OM group and r is 0 or varies from 1 to 3, M being as defined above.

According to one embodiment, in formula (III), n is equal to 19.

According to one embodiment, in formula (III), n is equal to 31.

According to one embodiment, in formula (III), m is equal to 3.

According to one embodiment, in formula (III), m is equal to 10.

According to one embodiment, in formula (III), r is equal to 3.

A specific group of compounds according to the invention is composed of compounds with formula (III) as defined above, wherein n=19 and m=3.

Another specific group of compounds according to the invention is composed of compounds with formula (III) as defined above, wherein n=31 and m=10.

According to one embodiment, the compounds of the invention are compounds with the above-mentioned formula (I) wherein A stands for a group $A_3$ with formula (3) and $R_1$ is chosen from the group consisting of H and ($C_1$-$C_4$) alkyl groups, either linear or branched.

According to one embodiment, the compounds of the invention have the following formula (IV):

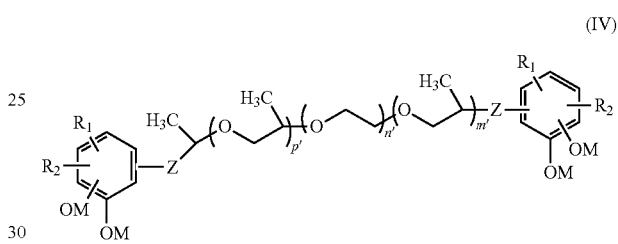

wherein:
$R_1$ is chosen from the group consisting of H and ($C_1$-$C_4$) alkyl groups; and
M and $R_2$, n', m' and p' are as defined above for the formula (I), and
n', m' and p' are as defined above for formula (3).

Preferentially, in formula (IV), n' is an integer from 1 to 39.

According to one embodiment, in formula (IV), $R_2$ is an OM group, M being as defined above.

According to one embodiment, in formula (IV), $R_2$ is an OM group, M being as defined above, and r is 0 or varies from 1 to 3.

According to one embodiment, in formula (IV), Z is chosen from the group consisting of:
—$CHR_3$—NH— groups, where $R_3$ is chosen from the group consisting of H, COOH and ($C_1$-$C_6$) alkyl groups, either linear or branched; and
—C(=O)—NH— groups.

According to one embodiment, in formula (IV), Z is chosen from the group consisting of —$CHR_3$—NH—, $R_3$ is chosen from the group consisting of H, COOH and ($C_1$-$C_6$) alkyl groups, either linear or branched.

According to one embodiment, in formula (IV), Z is chosen from the group consisting of:
—$CHR_3$—NH— groups, $R_3$ being chosen from the group consisting of H and COOH; and
—C(=O)—NH— groups.

According to one embodiment, in formula (IV), Z is chosen from the group consisting of —$CHR_3$—NH—, $R_3$ is chosen from the group consisting of H and COOH.

A preferred family of compounds of the invention consists of compounds with the above-mentioned formula (IV), wherein:
R$_2$ is an OM group; and
Z is chosen from the group consisting of:
—CHR$_3$—NH— groups, where R$_3$ is chosen from the group consisting of H, COOH and (C$_1$-C$_6$) alkyl groups, either linear or branched; and
—C(=O)—NH— groups.

A preferred family of compounds of the invention consists of compounds with the above-mentioned formula (IV), wherein:
R$_2$ is an OM group; and
Z is chosen from the group consisting of —CHR$_3$—NH— groups, R$_3$ being chosen from the group consisting of H, COOH and (C$_1$-C$_6$) alkyl groups, either linear or branched.

Preferentially, in the above-mentioned formula (IV), R$_1$ is H.

A preferred family of compounds of the invention consists of compounds with the above-mentioned formula (IV), wherein:
R$_1$ is H;
R$_2$ is an OM group; and
Z is chosen from the group consisting of:
—CHR$_3$—NH— groups, where R$_3$ is chosen from the group consisting of H, COOH and (C$_1$-C$_6$) alkyl groups, either linear or branched; and
—C(=O)—NH— groups.

A preferred family of compounds of the invention consists of compounds with the above-mentioned formula (IV), wherein:
R$_1$ is H;
R$_2$ is an OM group; and
Z is chosen from the group consisting of —CHR$_3$—NH— groups, R$_3$ being chosen from the group consisting of H, COOH and (C$_1$-C$_6$) alkyl groups, either linear or branched.

A preferred family of compounds of the invention consists of compounds with the above-mentioned formula (IV), wherein:
R$_1$ is H;
R$_2$ is an OM group; and
Z is chosen from the group consisting of:
—CHR$_3$—NH— groups, R$_3$ being chosen from the group consisting of H and COOH; and
—C(=O)—NH— groups.

A preferred family of compounds of the invention consists of compounds with the above-mentioned formula (IV), wherein:
R$_1$ is H;
R$_2$ is an OM group; and
Z is chosen from the group consisting of —CHR$_3$—NH— groups, R$_3$ is chosen from the group consisting of H and COOH.

Among the compounds with formula (IV) according to the present invention, we can mention, in particular, the compounds described by the following formula:

n', m' and p' as defined above.

The present invention also relates to the use of a compound as defined above, described by formula (I), or by one of the formulae (II), (III) or (IV), as a chelating agent of positively charged ions, in particular chosen from the group consisting of alkaline ions, alkaline earth ions and transition metal ions, more particularly as a chelating agent for calcium, magnesium, manganese, iron, nickel or cobalt ions.

The present invention also relates to the use of a compound as defined above, described by formula (I), or by one of the formulae (II), (III) or (IV), as a fluidizing agent for hydraulic compositions.

The present invention also relates to the use of a compound as defined above, described by formula (I), or by one of the formulae (II), (III) or (IV), as an admixture to hydraulic binders.

The present invention also relates to the use of a compound as defined above, described by formula (I), or by one of the formulae (II), (III) or (IV), as an admixture to hydraulic binders, either alone or in combination with at least one plasticizer and/or superplasticizer.

Within the framework of the present invention, the term "hydraulic binder" refers to any compound having the property to hydrate in the presence of water, the hydration thereof producing a solid with mechanical characteristics, including cement such as Portland cement, aluminized cement, pozzolanic cement or an anhydrous or semi-hydrated calcium sulfate. The hydraulic binder may be a cement according to EN197-1 (2001) and in particular a Portland cement, mineral additions, particularly slurries, or a cement containing mineral additions.

"Mineral additions" refers to slurries (as defined in the Cement Standard NF EN 197-1(2012) paragraph 5.2.2), slags from steel plants, pozzolanic materials (as defined in the Cement Standard NF EN 197-1(2012) paragraph 5.2.3), fly ash (as defined in the Cement standard NF EN 197-1 (2012) paragraph 5.2.4), calcined schists (as defined in Cement standard NF EN 197-1(2012) paragraph 5.2.5), limestones (as defined in the Cement standard NF EN 197-1(2012) paragraph 5.2.6) or silicate fumes (as defined in the Cement standard NF EN 197-1(2012) Subsection 5.2.7)

or the mixtures thereof. Other additions, not currently recognized by the standard cement NF EN 197-1(2012), may also be used. It concerns, in particular, metakaolins, such as type A metakaolins as per the standard NF P 18-513 (August 2012), siliceous additions, such as silica additions of Qz mineralogy as per the standard NF P 18-509 (September 2012), alumino-silicates in particular inorganic geopolymers.

The compounds of the present invention can be used as admixture in hydraulic binders in combination with plasticizers and/or superplasticizers in a mixture between 1% and 99%.

Among these plasticizers and/or superplasticizers, among those well known in the technical field, examples are polyoxyalkylene polycarboxylates (PCP) or poly(ethylene oxide)bis-phosphonates single-chains described in patent FR 2 696 736, And marketed by THE Company CHRYSO under the name of CHRYSO® Fluid Optima 100.

Preferentially, the compounds of the invention are used in combination with the aforementioned Optima 100, in a mixture between 1% and 99% in Optima 100, and in particular, between 25% and 75%.

Preferentially, the compounds of the invention are used in combination with a PCP in a mixture between 1 and 99% PCP, and in particular, between 25% and 75%.

The present invention also relates to the use of a compound as defined above, described by formula (I), or one of the formulae (II), (III) or (IV) to decrease the sensitivity to phyllosilicate clays of a hydraulic composition.

The presence of phyllosilicate clay in sand, preferentially montmorillonites, even more preferentially sodium montmorillonites, can strongly affect the workability of hydraulic binder compositions, in particular concrete compositions. Indeed, the layered structure of clays enhances the absorption of water and the intercalation of the elements contained in the hydraulic binder compositions, such as e.g. superplasticizers. The quantity of clay is generally measured by a methylene blue test (NF EN 933-9 standard).

Such phenomena cause an increase in the viscosity of the hydraulic binder paste and hence, a loss of workability. A fluidifier over-proportioning is then necessary to compensate for the consumption thereof by the clays, and to maintain the desired performance. A fluidifier is used to decrease the sensitivity to phyllosilicate clays of a hydraulic composition when the increase in the dosage thereof for achieving even spreading, is as low as possible, e.g. between 0% and 20%, when the phyllosilicate clay content varies.

The present invention also relates to the use of a compound as defined above, described by formula (I), or one of the formulae (II), (III) or (IV) for decreasing the sensitivity to alkaline sulfates in solution of a hydraulic composition.

Alkaline sulfates in solution are competitors for the adsorption of fluidifiers on cement grains. The measurement of the level of alkaline sulfates in solution is performed using the method described in "Techniques et méthodes des laboratoires des ponts et chaussées, Méthode d'essai ME48-4p-1997". The fluidifier proportioning is therefore dependent on the level of alkaline sulfate in solution: the higher the concentration, the higher the proportion of fluidifier so as to achieve the same target performance. A fluidifier is used to decrease the sensitivity to alkaline sulfates in solution in a hydraulic composition when the increase in the dosage thereof for achieving even spreading, is as low as possible, e. g. between 0% and 20%, when the level of alkaline sulfates in solution varies, e.g. same goes from a level considered low (below 0.2% by weight of cement) to a high level (above 0.6% by weight of cement).

The present invention also relates to the use of a compound as defined above, described by formula (I), or by one of the formulae (II), (III) or (IV), for the preparation of a hydraulic composition comprising:
 a compound as defined above, described by formula (I), or by one of the formulae (II), (III) or (IV),
 at least one hydraulic binder (e.g. a hydraulic binder, or two hydraulic binders for binary systems or three hydraulic binders for ternary systems),
 at least one aggregate, and
 water.

Hydraulic compositions may include concrete, mortar, screed or grout.

Hydraulic compositions are prepared in a traditional way by mixing the above constituents. The present invention also relates to the method for preparing a hydraulic composition comprising the step of mixing of:
 a compound as defined above,
 at least one hydraulic binder,
 at least one aggregate, and
 water,
 Components being added in whatever order.

The compound according to the present invention may be added to other components of the hydraulic composition either dry (generally in powder form) or in solution, preferentially in an aqueous solution.

Thus, according to another aspect, the present invention relates to a fluidifier (or plasticizer) for hydraulic compositions comprising the compound as defined above, in solution in a solvent, especially in an aqueous solution, preferentially from 5% to 50% by weight of the compound, in particular, from 10% to 30% by weight, in particular, on the order of 20% by weight with respect to the total weight of the solution. In particular, the water of said aqueous solution can be pre-wetting water. "Pre-wetting water" refers to a part of the total water, which is used to moisten the aggregates before the mixing so as to simulate the often-wet hygrometric state of aggregates in a concrete plant or on a work-site. Said aqueous solution, which comprises the compound, may include other admixtures, e.g. an anti-foaming agent, an air-entraining admixture, a setting accelerator or retarder, a rheology modifier agent, another fluidifier (plasticizer or superplasticizer) and/or any other admixture that is classically used in hydraulic compositions. In a preferred embodiment, said aqueous solution comprising the polymer comprises a fluidifier, in particular a superplasticizer, e. g. a CHRYSO® Fluid Premia 180 or CHRYSO® Fluid Premia 196 superplasticizer.

Within the framework of the present invention, "cement" refers to cement as per the EN 197-1 (2001) standard and in particular of type EMC I, EMC IL, EMC III, EMC IV or EMC V cement as per the Cement standard NF EN 197-1 (2012). Cement may comprise mineral additions.

"Aggregates" refers to a set of mineral grains with an average diameter of 0 to 125 mm. Depending on the diameters thereof, aggregates are classified in one of the following six families: fillers, ultra-fine sands, sands, gravel sand mix, peagravel and ballast (XP P 18-545). The most commonly used aggregates are the following:
 fillers, which have a diameter of less than 2 mm and for which at least 85% of the aggregates have a diameter of less than 1.25 mm and at least 70% of the aggregates have a diameter of less than 0.063 mm,
 sands with a diameter comprised between 0 and 4 mm (in the NF EN 13-242 standard; the diameter could be up to 6 mm),
 gravel sand mix with a diameter greater than 6.3 mm, peagravel with a diameter comprised between 2 and 63 mm.

Sands are thus included in the definition of aggregate according to the invention.

Fillers can come, in particular, from limestone or dolomite.

During the mixing stage, other admixtures may be added, e.g. a mineral addition and/or admixtures, e.g. an air-entraining admixture, an anti-foaming agent, a setting accelerator or retarder, a rheology modifier agent, another fluidifier (plasticizer or superplasticizer), including a superplasticizer, e.g., a CHRYSO® Fluid Premia 180 or CHRYSO® Fluid Premia 196 superplasticizer.

Generally, 0.1% to 1% by dry weight of the compound according to the invention are used in the hydraulic composition.

The present invention also relates to a fluidifier for a hydraulic composition comprising a compound as defined above, described by formula (I), or by one of the formulae (II), (III) or (IV).

The present invention also relates to a hydraulic composition, especially chosen amongst concrete, mortars, screeds and grout, comprising:
- a compound as defined above, described by formula (I), or by one of the formulae (II), (III) or (IV),
- at least one hydraulic binder,
- at least one aggregate, and
- water.

The hydraulic composition may also comprise the above admixtures.

DESCRIPTION OF THE PREFERRED EMBODIMENTS

Examples

Part 1—Synthesis of Compounds

Pyrogallol, gallic acid, formalin and glyoxylic acid were obtained from SIGMA ALDRICH.

Jeffamine® M2070, M1000 and ED 600 were obtained from HUNTSMAN. The HPLC chain:
- Thermo Scientific, UHPLC Ultimate 3000, equipped with a Chromoleon 7.2 software
- Column: Thermo Scientific, Acclaim carbonyl C18, Size: 4.6×150 mm, diameter: 120 Å; 5 µm
- Detectors: DEDL: SEDEX LC LT ELCD; UV: UHPLC Ultimate 3000.

Example 1: Summary of a Representative Structure 1

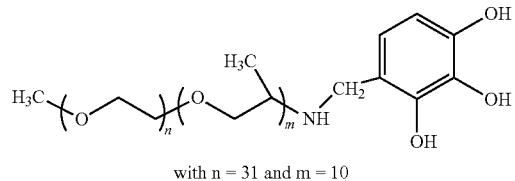

with n = 31 and m = 10

In a three-neck flask with a coolant, 37% formalin (1 equivalent; 0.03 mol; 2.4 g) was added drop by drop to a Jeffamine® M2070 solution (1 equivalent; 0.03 mol; 62.1 g) in 60 ml of water. The reaction medium was stirred at room temperature for 1 hour. Pyrogallol (1 equivalent; 0.03 mol; 3.78 g) was added to the reaction medium and the temperature is increased to 60° C. until pyrogallol disappeared (monitored by HPLC).

Example 2: Summary of a Representative Structure 2

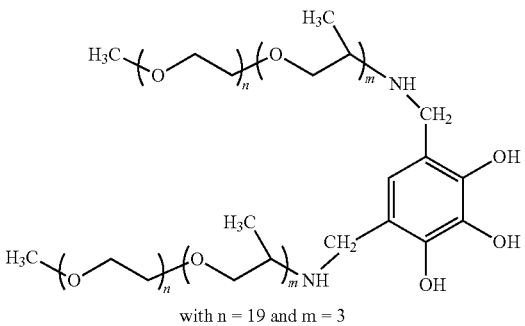

with n = 19 and m = 3

In a three-neck flask with a coolant, 37% formalin (2 equivalents; 0.06 mol; 4.8 g) was added drop by drop to a Jeffamine® M1000 solution (2 equivalents; 0.06 mol; 62.1 g) in 100 ml of water. The reaction medium was stirred at room temperature for 1 hour. Pyrogallol (1 equivalent; 0.03 mol; 3.78 g) was added to the reaction medium and the temperature was increased to 60° C. until pyrogallol disappeared (monitored by HPLC).

Example 3: Summary of a Representative Structure 3

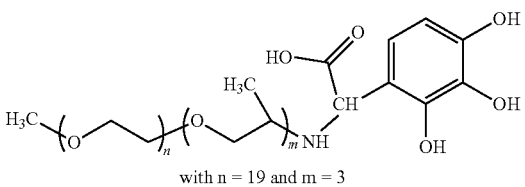

with n = 19 and m = 3

In a three-neck flask with a coolant, 50% glyoxylic acid solution (1 equivalent; 0.03 mol; 4.42 g) was added drop by drop to a Jeffamine® M2070 solution (1 equivalent; 0.03 mol; 62.1 g) in 60 ml of water. The reaction medium was stirred at room temperature for 1 hour. Pyrogallol (1 equivalent; 0.03 mol; 3.78 g) was added to the reaction medium and the temperature was increased to 60° C. until pyrogallol disappeared (monitored by HPLC).

Example 4: Summary of a Representative Structure 4

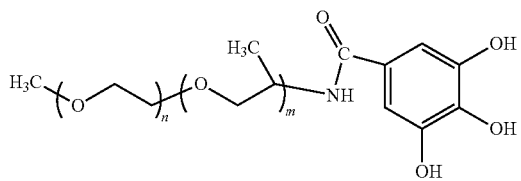

with n = 19 and m = 3

In a four-neck flask with a Dean Stark and a coolant, Jeffamine® M1000 (1.1 equivalents; 0.194 mol; 193.98 g) and gallic acid (1 equivalent; 0.176 mol; 30 g) were introduced. The reaction medium was increased to 160° C. under vacuum and stirred until pyrogallol disappeared (monitored by HPLC).

Example 5: Summary of a Representative Structure

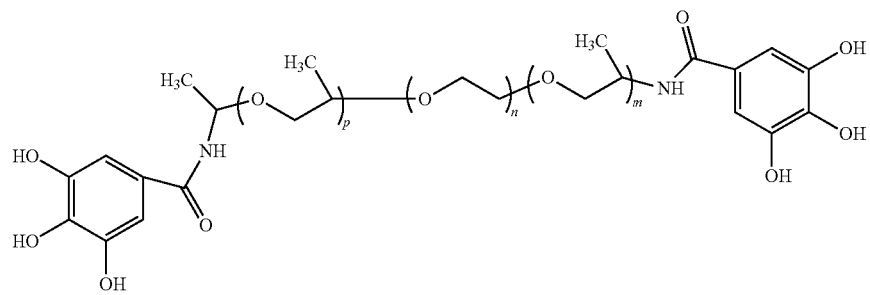

with n = 9 and m + p = 3.6

In a four-neck flask with a Dean Stark and a coolant, Jeffamine® ED-600 (1.1 equivalents; 0.194 mol; 116.39 g) and gallic acid (1 equivalent; 0.176 mol; 30 g) were introduced. The reaction medium was increased to 160° C. under vacuum and stirred until pyrogallol disappeared (monitored by HPLC).

Part 2—Applications

AFNOR standardized sand was introduced into the bowl of a PERRIER mixer. After mixing the sand for 30 s at 140 rpm, the pre-wetting water was introduced into the bowl within 15 s. The volume of this water represented one third of the total volume of effective water to be added. Mixing was continued for 15 s and the pre-wetting sand was left to rest for 4 min 30. The cement and lime filler (origin: ERBRAY) were then added to the pre-wetted sand and the whole was mixed at 140 rpm for 1 min before the rest of the total effective water and the whole admixture was introduced over 30 s. The mixer was stopped for the edges of the bowl to be scraped in order to produce homogeneous mortar and the mixing was then resumed for 1 min at 280 rpm.

Initial water reduction and workability maintenance were obtained by measuring the diameter of the spreading obtained as per the following procedure:

A mold reproducing the Abrahams cone on a one-half scale was filled with the mortar. In order to obtain the spreading, this cone was lifted at 90° from the plate by performing a quarter turn. The spreading was measured with a ruler at 5, 30, 60 and 90 minutes on two diameters at 90° from each other. The indicated measurement was then the average of the two spreadings with an uncertainty of ±10 mm.

The tests were performed at 20° C.

The admixture proportioning was determined so as to have an initial spreading between 290 and 310 mm. This proportioning is expressed by weight with respect to the total weight of the binder (cement+filler).

The chemical compositions used in the application design studies are described below.

TABLE 1

Chemical composition of the compositions

| Component | Composition 1 | Composition 3 |
|---|---|---|
| Example 1 | 30% | |
| Example 3 | | 30% |

TABLE 1-continued

Chemical composition of the compositions

| Component | Composition 1 | Composition 3 |
|---|---|---|
| Anti-foam | 0.3% | 0.3% |
| Water | 69.7% | 69.7% |

Example 6: Comparison with a Reference without Admixture

TABLE 2

Hydraulic composition

| Component | Mass (g) |
|---|---|
| EMC I 52.5N Le Teil | 555.1 |
| Erbray filler | 237.9 |
| AFNOR sand | 1,350 |
| Admixture | to be adjusted |
| Effective water | 277.5 |

The results are grouped in Table 3 below, showing the spreading in mm as a function of time in minutes.

| | Without admixture | Composition 1 | Composition 3 |
|---|---|---|---|
| Calculated E.S (%) | 30.0% | 30.3% | 30.3% |
| Actual E.S. (%) | 29.54% | 30.23% | 30.15% |
| Proportioning (% total binder) | | 1.25% | 0.80% |
| Alkaline sulfate solution concentration | 0.11% | 0.11% | 0.11% |
| Effective water (g) | 277.5 | 277.5 | 277.5 |
| Added water (g) | 277.5 | 270.6 | 273.1 |
| SPREADING (mm) | | | |
| T5 | 150 | 300 | 290 |
| T30 | Not measured | 190 | 180 |
| T60 | Not measured | 170 | 155 |
| T90 | Not measured | 150 | Not measured |

As observed, the compounds according to the invention have fluidizing capacity. Indeed, at an equal volume of added water, the initial spreading was double when using the two structures in examples 1 and 3.

Example 7: Comparison with a CHRYSO®Fluid Optima 100 Reference

TABLE 4

| Hydraulic composition | |
|---|---|
| Component | Mass (g) |
| EMC I 52.5N Le Teil | 615 |
| Erbray filler | 265 |
| AFNOR sand | 1,350 |
| Admixture | to be adjusted |
| Effective water | 303 |

The results are grouped in Table 5 below, showing the spreading in mm as a function of time in minutes.

| | CHRYSO ®Fluid Optima 100 | Composition 1 | Composition 3 |
|---|---|---|---|
| Calculated E.S (%) | 30.0% | 30.3% | 30.3% |
| Actual E.S. (%) | 29.54% | 30.23% | 30.15% |
| Proportioning (% total binder) | 1.25% | 1.20% | 0.80% |
| Alkaline sulfate solution concentration | 0.11% | 0.11% | 0.11% |
| Effective water (g) | 303 | 303 | 303 |
| Added water (g) | 286.3 | 295.6 | |
| SPREADING (mm) | | | |
| T5 | 300 | 295 | 310 |
| T30 | 370 | 210 | 210 |
| T60 | 380 | 180 | 190 |
| T90 | 400 | 160 | 170 |
| T120 | 405 | Not measured | 150 |

As observed, the compounds of the invention have a greater fluidizing capacity than that of CHRYSO®Fluid Optima 100. Indeed, at the same volume of added water, the use of active materials for achieving the same initial spreading was lower than the Optima 100.

Example 8: Co-Admixturing with CHRYSO®Fluid Optima 100

TABLE 6

| Hydraulic composition | |
|---|---|
| Component | Mass (g) |
| EMC I 52.5N Le Teil | 555.1 |
| Erbray filler | 237.9 |
| AFNOR sand | 1,350 |
| Admixture | to be adjusted |
| Effective water | 277.5 |

The results are grouped in Table 7 below, showing the spreading in mm as a function of time in minutes.

| | CHRYSO ®Fluid Optima 100 | CHRYSO ®Fluid Optima 100 + Composition 1 |
|---|---|---|
| Proportioning (% total binder) | 0.70% | 0.3% CHRYSO ®Fluid Optima 100 + 0.3% composition 1 |
| Calculated E.S (%) | 30.0% | 30.0% |
| Actual E.S. (%) | 29.54% | 29.54% |
| Alkaline sulfate solution concentration | 0.11% | 0.11% |
| Effective water (g) | 277.5 | 277.5 |
| Added water (g) | 273.6 | 273.6 |
| SPREADING (mm) | | |
| T5 | 310 | 290 |
| T30 | 315 | 210 |
| T60 | 315 | 240 |
| T90 | 320 | 250 |
| T120 | 340 | 250 |
| T150 | 340 | 250 |
| T180 | 360 | Not measured |

As observed, the use of a compound according to the invention (example 1) in combination with CHRYSO®Fluid Optima 100, leads to obtaining a superior fluidizing capacity while maintaining an interesting workability. In fact, at equal volume of water added, the target spreading was achieved with less active material used for the mixture than for CHRYSO®Fluid Optima 100 alone.

Table 8 below shows the results for the mechanical properties. The measurements of mechanical resistances to bending and compression were performed as per the standard NF EN 196-1.

| Résistances mécaniques (Mpa) | CHRYSO ®Fluid Optima 100 | CHRYSO ®Fluid Optima 100 + Composition 1 |
|---|---|---|
| Rf 24 h | 3.3 | 5.1 |
| Rc 24 h | 13.3 | 23.9 |

Résistance mécaniques = Mechanical Resistances

A strong increase in resistance to bending (RF) and compression (RC) was observed after 24 h, which is a performance sought in the field of application.

Example 9: Study on the Robustness with Regard to Alkali

TABLE 9

| Hydraulic composition | |
|---|---|
| Component | Mass (g) |
| EMC I 52.5N Le Teil | 555.1 |
| Erbray filler | 237.9 |
| AFNOR sand | 1,350 |
| Admixture | to be adjusted |
| Effective water | 277.5 |

| | CHRYSO ®Fluid Optima 100 | CHRYSO ®Fluid Optima 100 | Composition 1 | Composition 1 |
|---|---|---|---|---|
| Calculated E.S (%) | 30.0% | 30.0% | 30.0% | 30.0% |
| Actual E.S. (%) | 29.54% | 29.54% | 30.23% | 30.23% |
| Proportioning (% total binder) | 0.70% | 1.05% | 1.25% | 1.25% |
| Alkaline sulfate ratio in solution | 0.11% | 0.60% | 0.11% | 0.60% |
| Effective water (g) | 277.5 | 277.5 | 277.5 | 277.5 |
| Added water (g) | 273.6 | 271.6 | 270.6 | 270.6 |
| SPREADING (mm) | | | | |
| T5 | 310 | 300 | 300 | 320 |
| T30 | 315 | 270 | 190 | 270 |
| T60 | 315 | 270 | 170 | 240 |
| T90 | 320 | 280 | 150 | 210 |
| T120 | 340 | 285 | — | 180 |
| T150 | 340 | 300 | | 155 |

As observed, the use of a compound according to the present invention, leads to obtaining a robustness of the fluidizing capacity with regard to the concentration of alkaline sulfates in solution, unlike with the reference CHRYSO®Fluid Optima 100. In fact, for the same volume of added water, the CHRYSO®Fluid Optima 100 proportioning was increased by 50% in order to obtain the same initial spreading when the soluble alkali concentration increases, while remaining the same for the compound of the invention.

| Mechanical resistances (MPa) | CHRYSO ® Fluid Optima 100 | CHRYSO ® Fluid Optima 100 | Composition 1 | Composition 1 |
|---|---|---|---|---|
| Rf 24 h | 3.3 | 3.8 | 4.7 | 5.2 |
| Rc 24 h | 13.3 | 14.5 | 24.4 | 30.7 |

A strong increase in the resistance to bending and compression is found after 24 h, which is a performance sought in the field of application.

Example 10: Comparative Example with Regard to the Compounds from WO 2009/112647

The compound with the formula shown below was prepared:

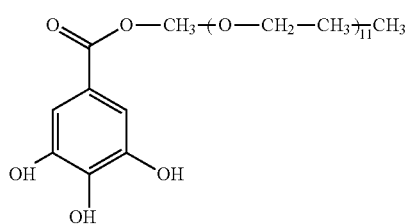

In a three-neck flask with a coolant, MPEG 500 (1.1 equivalent, 0.13 mol, 60.0 g), gallic acid (1 equivalent, 0.12 mol, 21.2 g) and paratoluene sulfonic acid (3.0 g) were added and heated to 130° C. under vacuum until the gallic acid disappeared (monitored by HPLC).
Stability Study at pH=13
In order to compare the stability of this molecule in the alkaline concrete medium, the compounds in example 1 and in the comparative example 10 were put into solution at pH=13 and their degradation was monitored by HPLC.

According to the chromatograms obtained, there was no change in the peak corresponding to the compound in example 1 under the study conditions, whereas there was a sharp decrease of the peak corresponding to the compound in example 10 (comparative). Since these peaks are representative of the molecule concentration in the medium, the instability of the structure according to WO 2009/112647 was demonstrated in comparison with the structures according to the invention.

The invention claimed is:

1. A compound with the following formula (I):

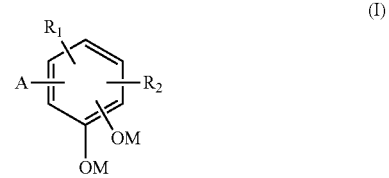

wherein:

M is chosen from the group consisting of H, alkaline and alkaline earth metals and $^+HNRR'$ groups, R and R' being chosen independently from each other from H, ($C_1$-$C_3$) alkyl, either linear or branched, and alcohols in $C_1$-$C_3$, either linear or branched;

$R_1$ is chosen from the group consisting of H, $A_1$ and ($C_1$-$C_4$) alkyl groups, either linear or branched, when A is described by formula (1) below, or, where A is described by formula (2) or (3) below, $R_1$ is chosen from the group consisting of H and ($C_1$-$C_4$) alkyl groups, either linear or branched;

$R_2$ is chosen from the group consisting of H, OM, M being as defined above and from ($C_1$-$C_4$) alkyl groups, either linear or branched;

A stands for:
a group $A_1$ with the following formula (1):

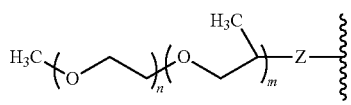

wherein:
n is an integer from 1 to 40;
m is an integer from 1 to 40; and
Z is chosen from the group consisting of:
—$CHR_3$—NH— groups, $R_3$ being chosen from the group consisting of H, COOH and ($C_1$-$C_6$) alkyl groups, either linear or branched;
—C(=O)—NH— groups; and
—C($R_5$)=N— groups, where $R_5$ is H or Me;
* a group $A_2$ with the following formula (2):

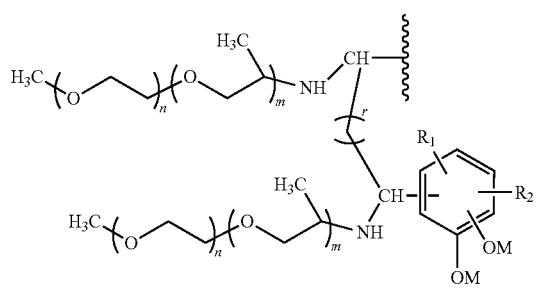

wherein:
n is an integer from 1 to 40, preferentially from 1 to 31;
m is an integer from 1 to 40, preferentially from 1 to 31;
r is 0 or an integer from 1 to 6; and
M, $R_1$ and $R_2$ are as defined above in formula (I);
* a group $A_3$ with the following formula (3):

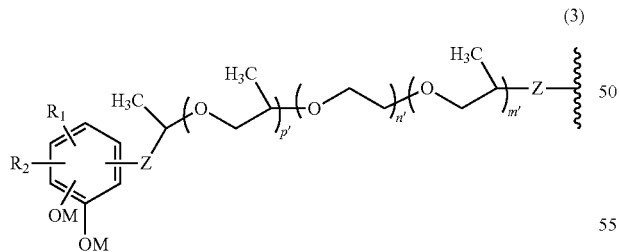

wherein:
n' is an integer from 1 to 50;
the sum of m'+p' varies from 1 to 6;
m' is an integer from 1 to 5;
p' is an integer from 1 to 5; and
M, $R_1$ and $R_2$ are as defined above in formula (I);
Z is as defined above in formula (1).

2. The compound according to claim 1, having the following formula (II):

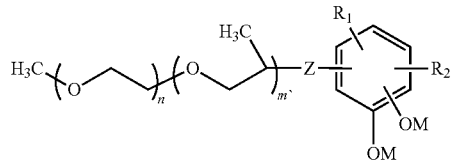

wherein:
$R_1$ is chosen from the group consisting of H and ($C_1$-$C_4$) alkyl groups, or stands for a group $A_1$ with formula (1) as defined in claim 1; and
M, $R_2$, n, m are as defined in claim 1.

3. A hydraulic composition comprising:
the compound of claim 2,
at least one hydraulic binder,
at least one aggregate, and
water.

4. The compound with formula (II) according to claim 2, wherein:
$R_2$ is an OM group;
n varies from 19 to 31;
m varies from 3 to 10; and
Z is chosen from the group consisting of:
—$CHR_3$—NH— groups, where $R_3$ is chosen from the group consisting of H, COOH and ($C_1$-$C_6$) alkyl groups, either linear or branched; and
—C(=O)—NH— groups.

5. A hydraulic composition comprising:
the compound of claim 4,
at least one hydraulic binder,
at least one aggregate, and
water.

6. The compound with formula (II) according to claim 4, wherein $R_1$ is H or stands for a group $A_1$ with formula (1).

7. A hydraulic composition comprising:
the compound of claim 6,
at least one hydraulic binder,
at least one aggregate, and
water.

8. The compound according to claim 1, having the following formula (III):

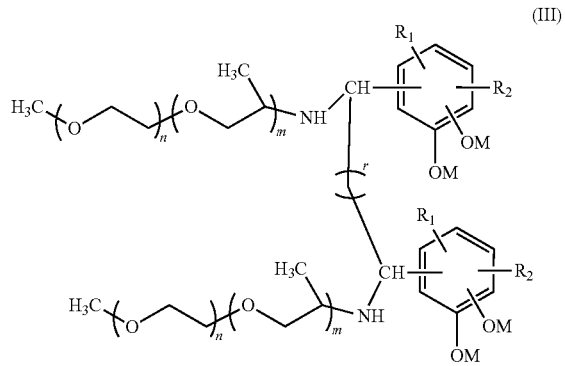

wherein:
$R_1$ is chosen from the group consisting of H and ($C_1$-$C_4$) alkyl groups; and
M, $R_2$, n, m and r are as defined in claim 1.

9. A hydraulic composition comprising:
the compound of claim 8,
at least one hydraulic binder,
at least one aggregate, and
water.

10. The compound with formula (III) according to claim 8, wherein $R_1$ is H and $R_2$ is an OM group and r is 0 or varies from 1 to 3.

11. A hydraulic composition comprising:
the compound of claim 10,
at least one hydraulic binder,
at least one aggregate, and
water.

12. The compound according to claim 1, described by the following formula (IV):

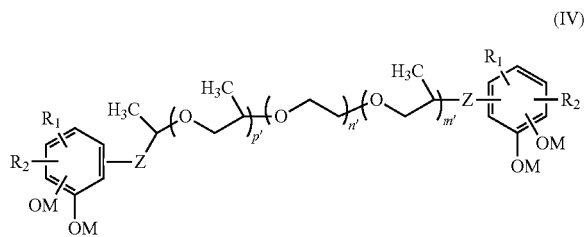

wherein:
$R_1$ is chosen from the group consisting of H and ($C_1$-$C_4$) alkyl groups; and
M, $R_2$, n', m' and p' are as defined in claim 1.

13. The compound with formula (IV) according to claim 12, wherein:
$R_1$ is H;
$R_2$ is an OM group; and
Z is chosen from the group consisting of:
—$CHR_3$—NH— groups, where $R_3$ is chosen from the group consisting of H, COOH and ($C_1$-$C_6$) alkyl groups, either linear or branched; and
—C(=O)—NH— groups.

14. A hydraulic composition comprising:
the compound of claim 12,
at least one hydraulic binder,
at least one aggregate, and
water.

15. A chelating agent of positively charged ions comprising a compound according to claim 1.

16. A hydraulic composition comprising:
a compound according to claim 1,
at least one hydraulic binder,
at least one aggregate, and
water.

17. A fluidizing agent for hydraulic compositions comprising a compound according to claim 1.

18. A admixture to hydraulic binders comprising a compound according to claim 1, alone or in combination with at least one plasticizer and/or superplasticizer.

19. A method to decrease the sensitivity to phyllosilicate clays of a hydraulic composition, comprising adding a compound according to claim 1 into said hydraulic composition.

20. A method to decrease the sensitivity to alkaline sulfates in solution of a hydraulic composition, comprising adding a compound according to claim 1 into said hydraulic composition.

* * * * *